United States Patent [19]
Konno et al.

[11] Patent Number: 5,229,984
[45] Date of Patent: Jul. 20, 1993

[54] SIGNAL PRODUCING APPARATUS FOR OPTICAL RECORDING/REPRODUCING APPARATUS FOR SUPPRESSING NOISES CAUSED BY LEAKING CURRENT OF PHOTODETECTOR

[75] Inventors: Osamu Konno, Iruma; Kazuhiro Akiyama; Kenji Yoshioka, both of Hachioji, all of Japan

[73] Assignee: Olympua Oprixl Co. Ltd., Tokyo, Japan

[21] Appl. No.: 797,879

[22] Filed: Nov. 26, 1991

[30] Foreign Application Priority Data

Nov. 28, 1990 [JP] Japan .................. 2-331924

[51] Int. Cl.$^5$ .................. G11B 7/00; G01J 1/20
[52] U.S. Cl. .................. 369/44.41; 369/44.32; 250/201.5
[58] Field of Search ............ 250/201.5, 211 J, 211 R; 369/44.41, 44.42, 44.37, 44.32, 44.11, 100, 124

[56] References Cited

U.S. PATENT DOCUMENTS

| | | | |
|---|---|---|---|
| 3,876,842 | 4/1975 | Bouwhuls | 369/44.41 |
| 4,309,604 | 1/1982 | Yoshikawa et al. | 250/211 J |
| 4,496,834 | 1/1985 | Nanba et al. | 250/211 R |
| 4,742,219 | 5/1988 | Ando | 369/44.42 |
| 4,807,209 | 2/1989 | Kramer et al. | 369/100 |
| 4,810,871 | 3/1989 | Opheij | 250/211 J |

FOREIGN PATENT DOCUMENTS 63-288436 11/1988 Japan .

*Primary Examiner*—Andrew L. Sniezek
*Assistant Examiner*—Nabil Hindi
*Attorney, Agent, or Firm*—Armstrong, Westerman, Hattori, McLeland & Naughton

[57] ABSTRACT

A photodetector to be used to produce a track error signal or the like by receiving the reflected light of light beams radiated to an optical recording medium is formed of a plurality of photodetecting devices provided as divided on a common chip and is provided with either a; leaking current absorbing member for suppressing a leaking current form overflowing through the chip from the photodetecting device receiving a light beam of a large light amount into the other photodetecting devices causing noises; or with a circuit for preventing the generation of a leaking current.

20 Claims, 9 Drawing Sheets

SIGNAL PRODUCING APPARATUS FOR OPTICAL RECORDING/REPRODUCING APPARATUS FOR SUPPRESSING NOISES CAUSED BY LEAKING CURRENT OF PHOTODETECTOR

BACKGROUND OF THE INVENTION

Field of the Invention

This invention relates to a signal producing apparatus for producing an error signal required to make a servo control in an optical recording/reproducing apparatus optically record or reproduce information.

Description of the Related Art

Recently, an optical information recording and reproducing apparatus has been developed for recording or reproducing high density information utilizing various optical information recording media such as an optical card, compact disc, video disc or magnetic-optical disc, instead of recording or reproducing information using a magnetic head. A light beam produced and/or detected by an optical pickup is used for such recording or reproduction. A tracking error and a focusing error are detected by using such pickup. In such detection, methods are know in which wherein one beam may be used or three beams may be used.

FIG. 1 illustrates the formation of an optical system of a prior art example wherein a tracking error and focusing error are detected by using three beams. A light emitted from a laser diode 1 enters a diffraction grating 3 through a collimator lens 2. In this diffraction grating 3, one main beam 8 and two side beams 9 are produced. The light beams emitted from the diffraction grating 3 are reflected by a beam splitter 5 and are radiated to an optical recording medium 7 through an objective lens 4. Then the light beams reflected by the optical recording medium 7 enter a photodetector 6 through the objective lens 4, the beam splitter 5 and an image forming lens 30.

The main beam is used to detect a focusing error signal and RF signal by using an astigmatic method in which a light receiving device consists of a cylindrical lens and a four-division photodetector, for example.

The two side beams are used to produce a tracking error signal which is calculated by the difference of the light amount of the side beams.

FIG. 2 illustrates the arrangement of the photodetecting devices of the prior art example forming the photodetector 6 of FIG. 1.

This photodetector 6 is formed on one chip 6a and has three photodetecting devices A/B, C/D and E/F, respectively, divided into two parts formed separately on the chip 6a. In this drawing, among the respective photodetecting devices A to F, the photodetecting devices A and B are for detecting the main beam and the photodetecting devices C to F are for detecting the side beams.

FIG. 3 shows a part of a signal processing system for producing an error signal or the like from the photodetector 6 of FIG. 2. Operational amplifiers 13 to 18 are used as current/voltage converting circuits. Among them, operational amplifiers 15 and 16 are for receiving the main beam and operational amplifiers 13, 14, 17 and 18 are for receiving the side beams. A resistance R determining the gain of the current/voltage conversion is connected between the inverting input terminal and output terminal of each amplifier.

In the photodetecting devices A to F, a photocurrent is generated in response to the received light amount. This photocurrent is converted to a voltage, respectively, in the operational amplifiers 13 to 18 functioning as current/voltage converting circuits. This current is the above-described detecting signal. Here, the non-inverting input terminals of the respective operational amplifiers 13 to 18 are set at a fixed voltage. The allowable range of the current which can be converted in the current/voltage converting circuit is determined by this voltage, the values of the resistances R connected to the operational amplifiers 13 to 18.

Detecting signals VA to VF output from the respective operational amplifiers 13 to 18 are input into an operating circuit, not illustrated, for producing signals. This operating circuit operates to catch the tracking and focusing states more specifically a tracking error signal TE and focusing error signal FE are represented respectively as follows:

$$TE = (VC + VD) - (VE + VF) \text{ and}$$

$$FE = VE - VF.$$

In the photodetector of the above described optical information recording and reproducing apparatus by three beams, the tracking and focusing states are caught by using side beams.

FIG. 4 illustrates an example of each voltage against the emitted power P of the laser diode 1. Here, the power source voltage of the respective operational amplifiers shall be $\pm 6$ V. A reference potential (made 0 here) is applied to the non-inverting input terminals of the respective operational amplifiers 13 to 18. The voltage of a power source Vcc connected to the photodetector 6 is made 6 V.

With the increase of the emitted power P of the light emitted from the laser diode 1, the output voltage of each operational amplifier increases on the negative side in proportion to the emitted power P. Here, in comparing the light amount of the main beam and the light amount of the side beams with each other, the light amount of the main beam is found to be larger. Therefore, if the emitted power P is further increased, the operational amplifier output voltage VA (the same on VB) of the main beam will be saturated near $-6$ V, which is an output limit of the operational amplifier.

When the operational amplifier 16 is saturated, the inverting input terminal voltage Va of the operational amplifier 16 will begin to rise. This voltage Va will continue to rise while the emitted power P is P1 to P2. Thus, the voltage Va becomes higher than the voltage of 6 V of the power source connected to the photodetector 6. Finally, the voltage Va is saturated at the value obtained by adding the normal direction voltage of the photodiode which is the photodetecting device A (the same on B) to the power source voltage of 6 V. Thus, when the emitted power P becomes substantially above P2, the photodetector device A will be saturated.

Even when the photodetector device A is saturated, the emitted power P will increase, that is, in FIG. 4, when the emitted power P becomes substantially above P2, the photocurrent will overflow to the periphery through the clip 6a from the photodetecting device A. A part of the overflowing photocurrent will flow into the photodetecting devices C and D formed near this photodetecting device A. Then, the photocurrent flowing into the operational amplifier 17 will have the inflow photocurrent in addition to the normal photocurrent. Therefore, for example, the output voltage VD of the operational amplfiier 17 will vary in the inclination as shown in FIG. 4. Here, the amount of the photocurrent flowing into the photodetecting device D and others is different depending on the distance between the photodetecting devices A and D and arranging conditions.

From the above, in case a focusing or tracking is to be made by utilizing side beams, when the emitted power P emitted from the laser diode 1 is above P2, the photodetecting device to detect only the light amount of the side beams will be subjected to another influence and will vary in the output and there will be produced a problem that no accurate focusing or tracking will be able to be made.

SUMMARY OF THE INVENTION

An object of the present invention is to provide a signal producing apparatus wherein, even if the emitted power P of a light emitted from a laser diode is above P2, an accurate focusing or tracking will be able to be made.

Another object of the present invention is to provide a signal producing apparatus wherein an accurate focusing or tracking can be made with a simple formation.

The signal producing apparatus according to the present invention comprises an optical pickup provided with a light source for generating light beams and an optical system condensing and radiating the above-mentioned light beams on an optical recording medium on which tracks for recording information are formed and leading the light reflected by the above mentioned optical recording medium to a photodetector for receiving the light; a plurality of photodetecting devices forming the above-mentioned photodetector and formed on a common chip; a current/voltage converting circuit current/voltage converting the signal photoelectrically converted by the above mentioned photodetector; a calculating circuit producing at least one signal of a track error signal representing a position displacement in the direction crossing the above-mentioned tracks of a light spot radiated to the above-mentioned optical recording medium and a focus error signal representing a position displacement from the focus position of the above-mentioned light spot and a reproduced signal corresponding to the information recorded on the above mentioned tracks; and a suppressing means for suppressing the generation of noises caused by a leaking photocurrent leaking through the above-mentioned chip from the second photodetecting device on which a light amount incident upon the second photodector is larger than the light amount incident upon the first photodetecting device so that the noises caused by the leaking photocurrent may be suppressed from being generated in the track error signal or the like produced from the output of the first photodetecting device.

BRIEF DESCRIPTION OF THE DRAWINGS

FIG. 1 is a formation diagram showing the general formation of an optical information recording and reproducing apparatus.

FIG. 2 is an explanatory view showing the arrangement of photodetecting devices in a detector of the prior art example.

FIG. 3 is a circuit diagram showing a circuit of a current/voltage converter using the detector of FIG. 2.

FIG. 4 is an explanatory diagram for explaining the voltage variation of FIG. 3.

FIG. 5 is a formation view showing the formation of a photodetector in the first embodiment.

FIG. 6 is a circuit diagram showing the formation of a current/voltage converting circuit.

FIG. 7 is a formation diagram of a photodisc apparatus provided with the first embodiment.

FIG. 8 is a circuit diagram showing the formation of a signal producing circuit.

FIG. 9 is an explanatory view showing light beams radiated on a photodisc.

DETAILED DESCRIPTION OF THE PREFERRED EMBODIMENTS

Figure 7:
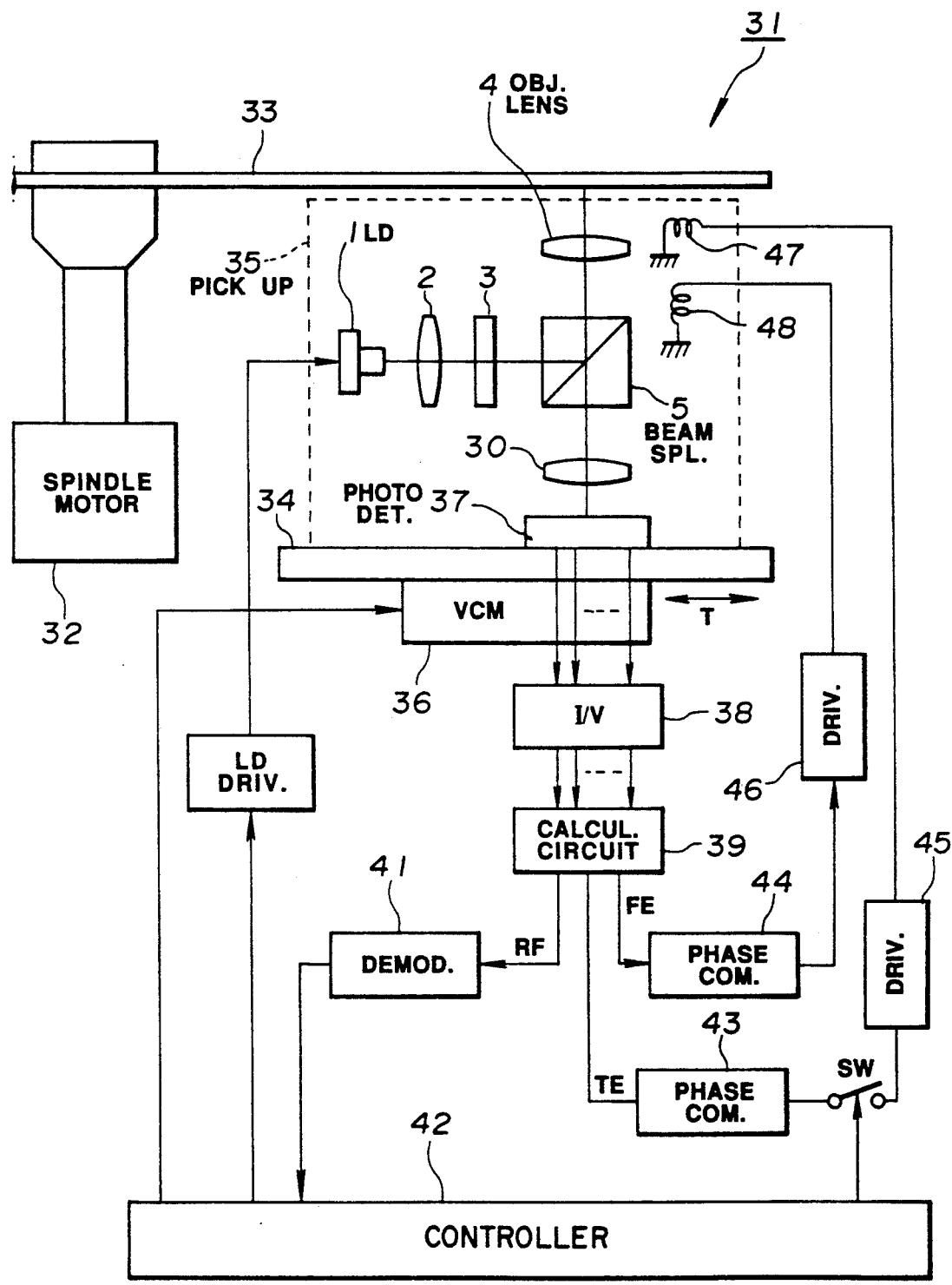

As shown in FIG. 7, in an optical apparatus 31 provided with the first embodiment of the present invention, an optical pickup 35 mounted on a carriage 34 is arranged as opposed to one surface of an optical 33 as an optical recording medium rotated and driven by a spindle motor 32 and can be moved together with the carriage 34 in the radial direction of the an optical disc 33, that is, in the track crossing direction T crossing the tracks by a voice coil motor (abbreviated as VCM) 36.

Figure 1:
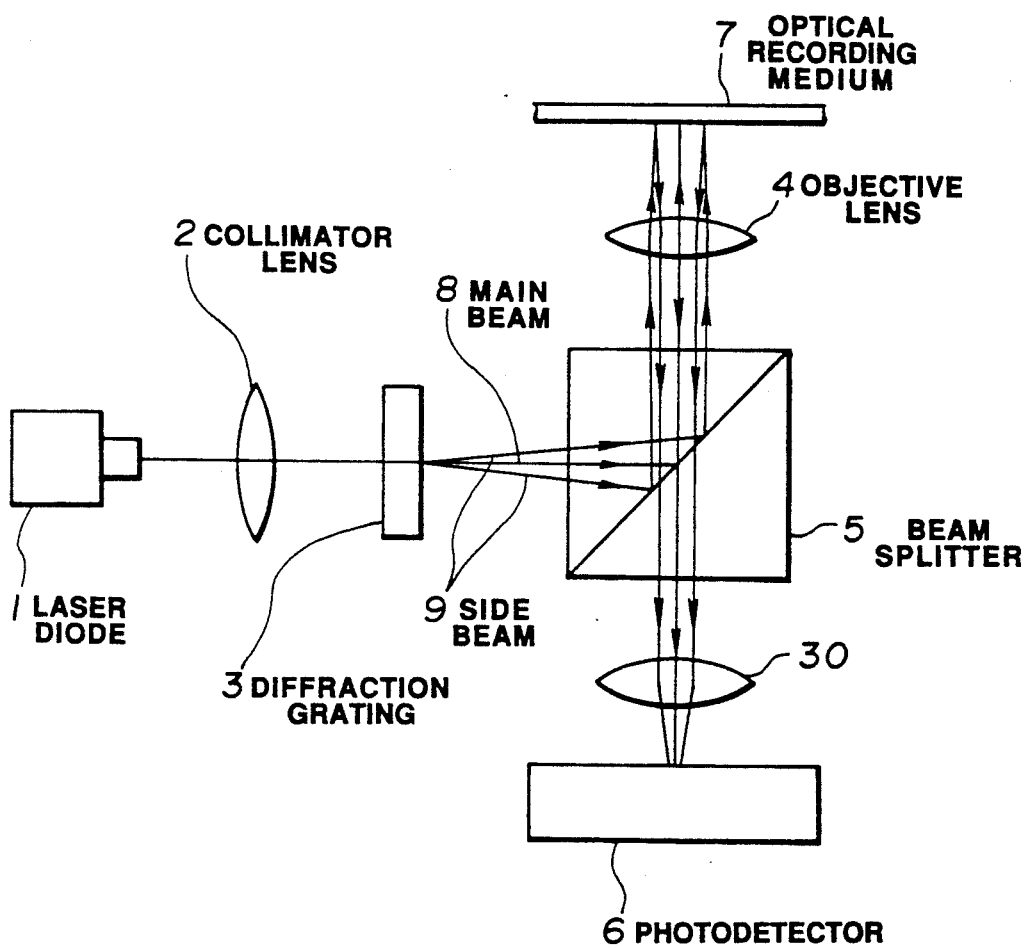
FIGS. 1 to 4 relate to a prior art example.

As shown in FIG. 1, a laser diode 1 is contained in this optical pickup 35 and the light of this laser diode 1 is divided into a main beam and two side beams through a collimator lens 2 and a diffraction grating 3 and is condensed and radiated on an optical disc 33 through a beam splitter 5 and objective lens 4. The light reflected by the an optical disc 33 is condensed by the objective lens 4 and partly passes through the beam splitter 5. The light having passed through this beam splitter 5 is made to form an image on a photodetector 37 by an image forming lens 30.

Figure 2:
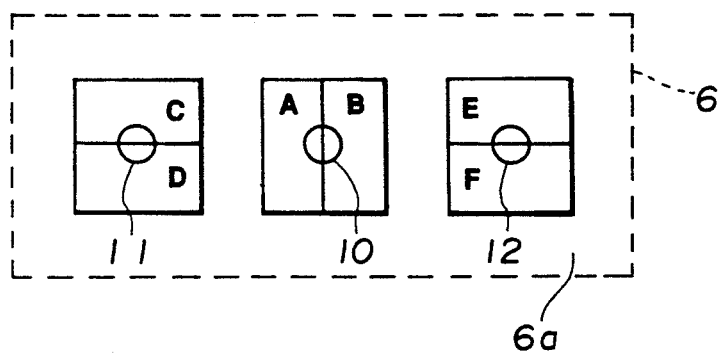
Figure 3:
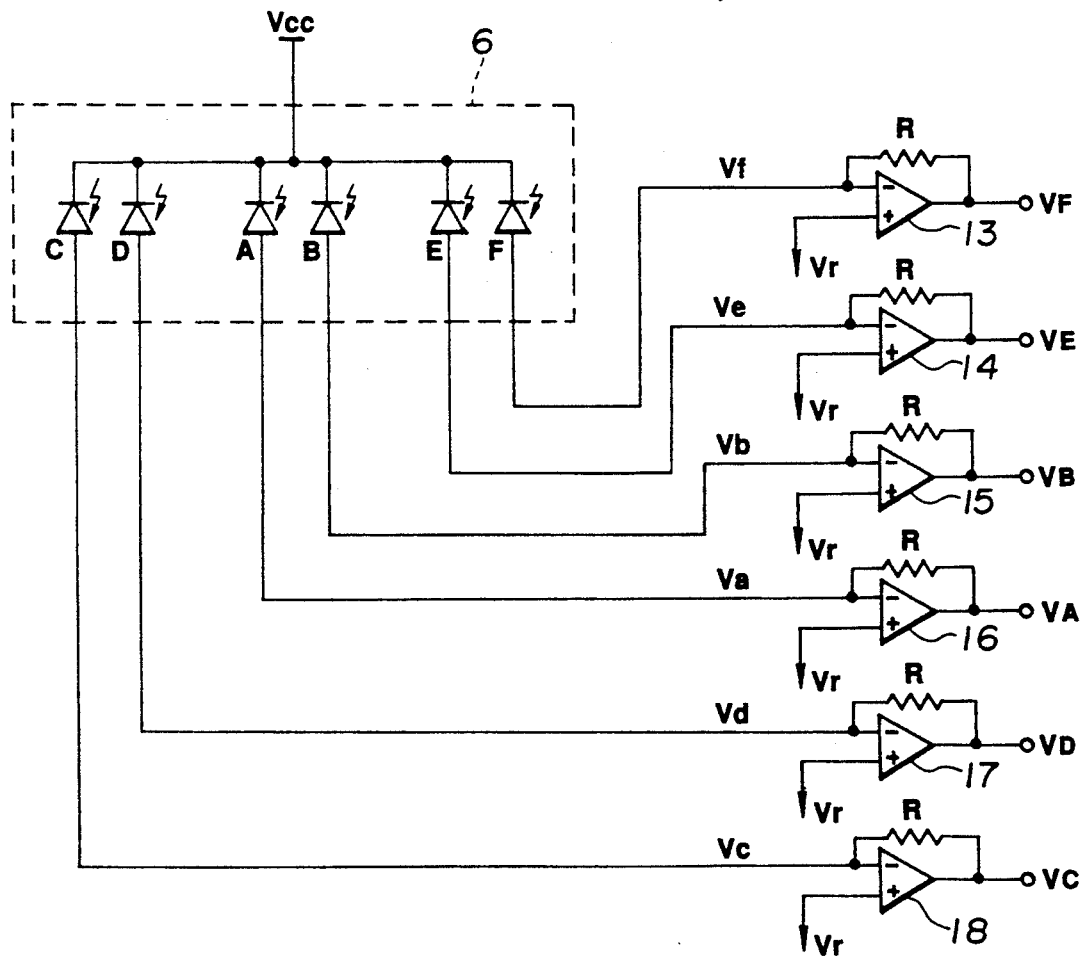
Figure 5:
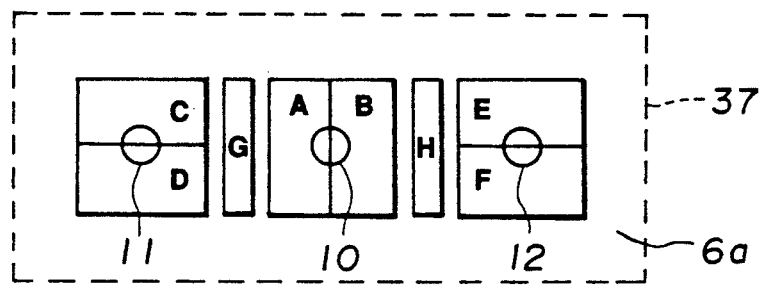
FIGS. 5 to 9 relate to the first embodiment of the present invention.

An optical disc 37 shown in FIG. 5 is provided with a photodetecting device G between a photodetecting device A and photodetecting devices C and D and with a photodetecting device H between a photodetecting device B and photodetecting devices E and F in the photodetector 6 shown in FIG. 2. The output of this photodetector 37 is converted to a voltage by a current-/voltage converting circuit (abbreviated as I/V in FIG. 7) 38 and is then input into a calculating circuit 39 making a calculation of producing error signals or the like to produce a reproduced signal RF and two error signals, that is, a tracking error signal TE and focusing error signal FE. The reproduced signal RF is demodulated through a demodulating circuit 41 and is output to a controller 42.

On the other hand, the tracking error signal TE and focusing error signal FE are phase compensated, respectively, by the phase compensating circuits 43 and 44 and become, respectively, a track controlling signal and focus controlling signal through the driving circuits 45 an 46. The track controlling signal and focus controlling signal are fed respectively to a track actuator 47 and focus actuator 48 forming lens actuators moving the objective lens 4 in the track crossing direction T and focus direction F.

When the track controlling signal and focus controlling signal are fed, respectively, to the track actuator 47 and focus actuator 48, the light spot formed of the light beams radiated to an optical disc 33 will hold a tracking state following the tracks and a focus state. By the way, here the focus direction F means a distance direction (of the objective lens 4 opposed to the photodisc 33) vertical to the surface of an optical disc 33. By the way, a switch SW is provided between the phase compensating circuit 43 and driving circuit 45 so that this switch SW will be off in case the controller 42 drives the VCM 36 to move the pickup 35 in the track crossing direction T.

FIG. 5 shows the arrangement of the photodetecting devices A to H forming the above-mentioned photodetector 37. In this drawing, among the three sets of photodetecting devices A and B: C and D: E and F, a photodetecting device G formed, for example, of a photodiode functioning as a means of absorbing or bypassing a photocurrent (leaking out of the photodetecting devices A and B) overflowing the photodetecting devices A and B is provided between the set of the photodetecting devices A and B receiving the main beam 10 of the largest incident light amount and the set of the photodetecting devices C and D receiving the side beam 11 (of a light amount, smaller than of the main beam 10) and formed as a slightly separated from the photodetecting devices A and B.

In the same manner, on the other side of the set of the photodetecting devices A and B, a photodetecting device H formed, for example, of a photodiode, for absorbing a photocurrent overflowing the photodetecting devices A and B is provided between the set of the photodetecting devices A and B and the set of the photodetecting devices E and F receiving the side beam 12 and formed as slightly separated from the photodetecting devices A and B.

Figure 9:
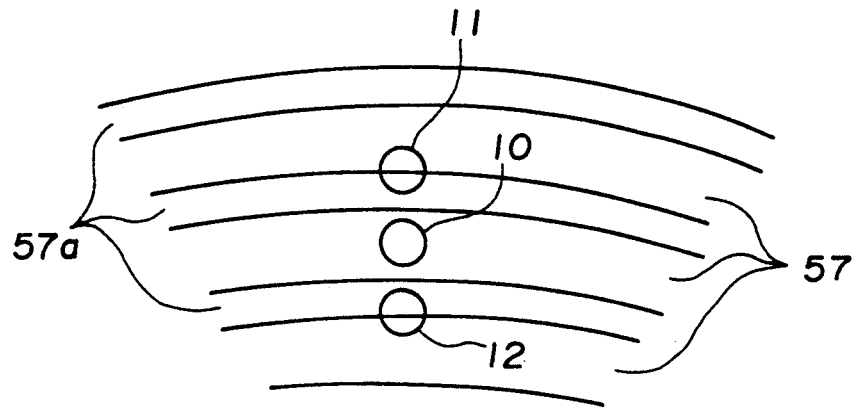

If the beams 10, 11 and 12 radiated to the tracks 57 and track guide 57a ...(See FIG. 9) for recording information formed on an optical disc 33 are, for example, in a focus state and tracking state, as shown in FIG. 9, the beam 10 will be radiated in the center of the track 57 and the two beams 11 and 12 will be radiated on both sides of the beam 10 and will cover the track 57 and track guide 57a with their respective halves.

If the beams reflected from an optical disc 33 are detected with the above-mentioned photodetector 37 in this state, they will be as shown in FIG. 5. That is to ay, the beam 10 will be detected by the photodetecting devices A and B, the beam 11 will be detected by the photodetecting devices C and D and the beam 12 will be detected by the photodetecting devices E and F. By the main beam 10 scanning the track 57 in the center in this state, the recorded information by pits or the like recorded in the track 57 can be reproduced by obtaining the corresponding signal or the information can be recorded by radiating a modulated intense light beam.

Figure 6:
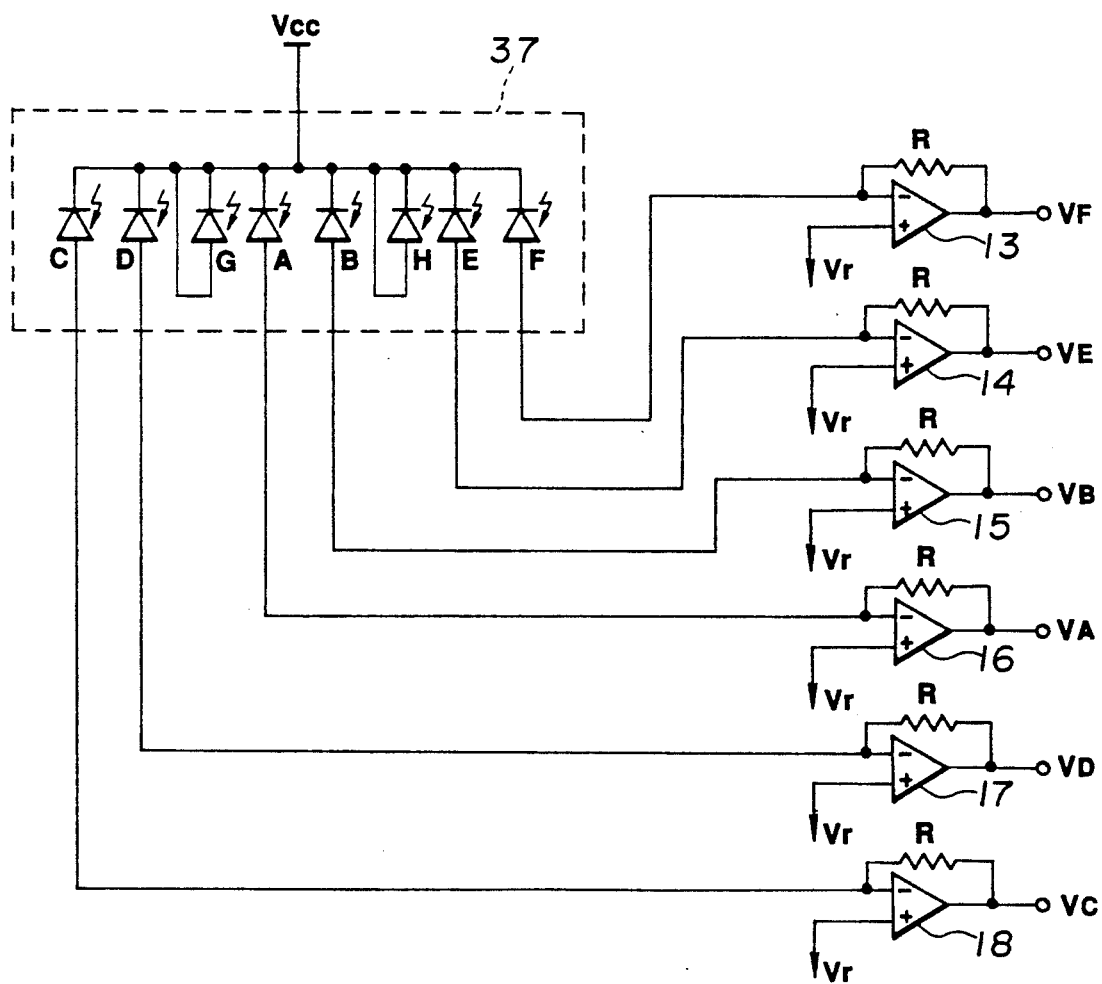

FIG. 6 shows a circuit formation from the photodetector 37 to the output of the current/voltage converting circuit 38. As shown in this diagram, in the photodetector 37, the photodetecting devices G and H are respectively shorted at the anodes and cathodes.

Therefore, even if a photocurrent leaks out of the photodetecting devices A and B and flows out to the side of the next photodetecting devices C, D and E, F, it will be absorbed by the shorted photodetecting devices G and H in the course and will be prevented from adversely influencing the photodetecting devices C, D and E, F as noise.

That is to say, when the light amount of the main beam 10 increases and the photodetecting devices A and B are saturated, the photocurrent overflowing the photodetecting devices A and B, that is, the leaking current, will flow out through the chip 6a around the photodetecting devices A and B but will be absorbed by the photodetecting devices G and H. This means of suppressing the generation of noises to the other photodetecting devices caused by the leaking photocurrent leaking from the photodetecting devices A and B formed in the photodetector 37 is a main feature of the first embodiment of this invention.

In particular, the photocurrent flowing out of the photodetecting devices A and B flows into the power source Vcc from the anode sides of the photodetecting devices G and H. Thereby, even if the photodetecting devices A and B receiving the main beam 10 of the largest light amount among the three beams incident upon the photodetector 37 are saturated and the photocurrent flows out through the chip 6a, the photodetecting devices C to F receiving the side beams of small light amounts will not be substantially influenced.

Figure 8:
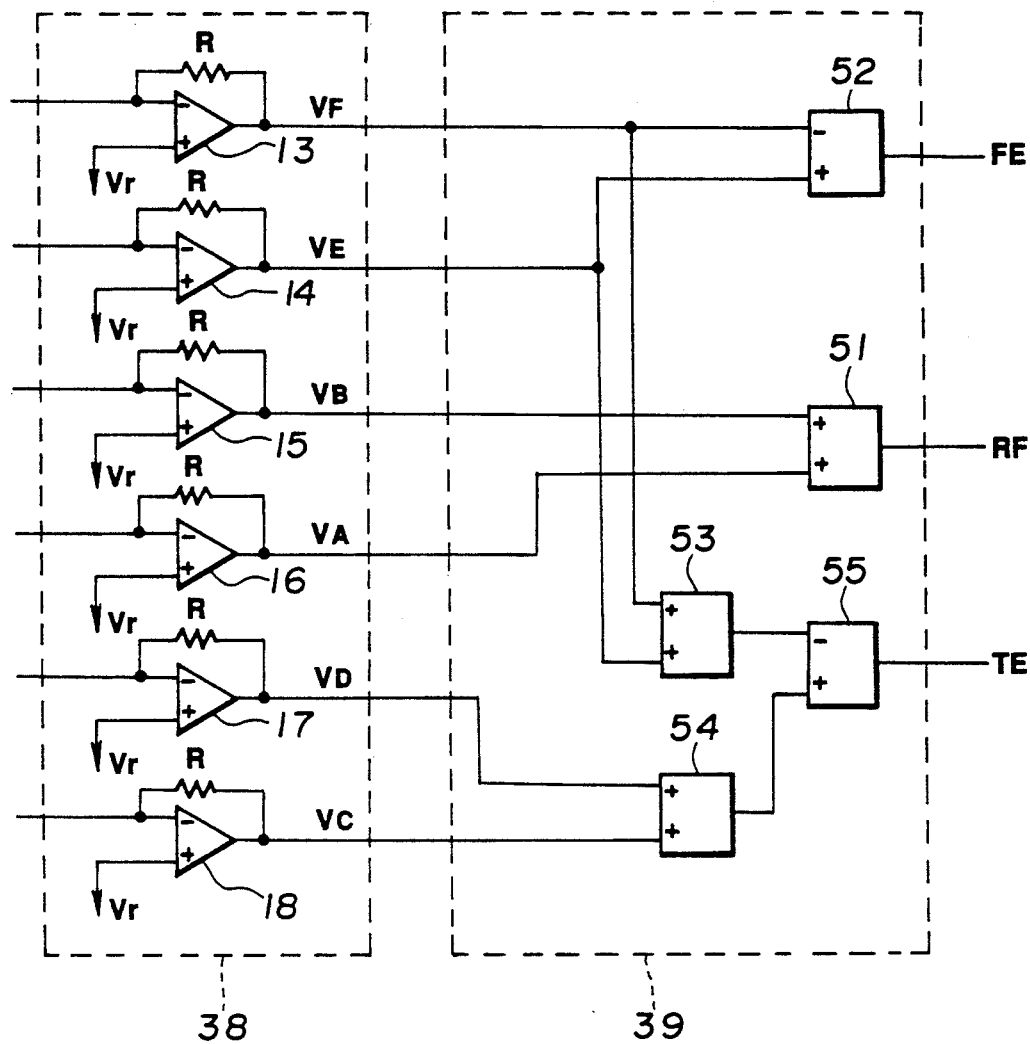

FIG. 8 shows a concrete circuit example of the calculating circuit 39. Among detected signals VA tp VF output from the operational amplifiers 13 to 18, the detected signals VA and VB are added together in an adder 51 to produce a reproduced signal RF. Then the detected signals VE and VF are subtracted from each other in a subtractor 52 to produce a focusing error signal FE. The detected signals VE and VF are added together in an adder 53, the detected signals VC and VD are added together in an adder 54, and the output of the adder 53 and the output of the adder 54 are subtracted from each other in a subtractor 55 to produce a tracking error signal TE.

As shown in FIG. 8, the photodetecting devices A and B receiving the main beam are only for the addition and therefore need not always be divided into two parts. Being divided into two parts, they can be used to first fix the photodetector 37 so that the output levels of the detected signals VA and VB may be equal to each other in the focus state.

Whereas the photodetecting devices E and F are required to be divided into two parts, the photodetecting devices C and D are only for the addition and therefore need not always be divided into two parts. This a is advantageous in that the photodetector 37 may be fitted as reversed on the right and left (See FIG. 5).

According to this first embodiment, the photocurrent flowing out of the photodetecting devices A and B through the chip 6a flows into the photodetecting devices G and H and into the power source Vcc from their anode sides. Thereby, even if the photodetecting devices A and B receiving the main beam 10 are saturated and flow out the photocurrent, as a means of suppressing the influence of noises formed in the photodetecting devices C to F, the focusing and tracking utilizing the side beams will not be influenced by the leaking current and a stabilized operation will be always possible.

Figure 10:
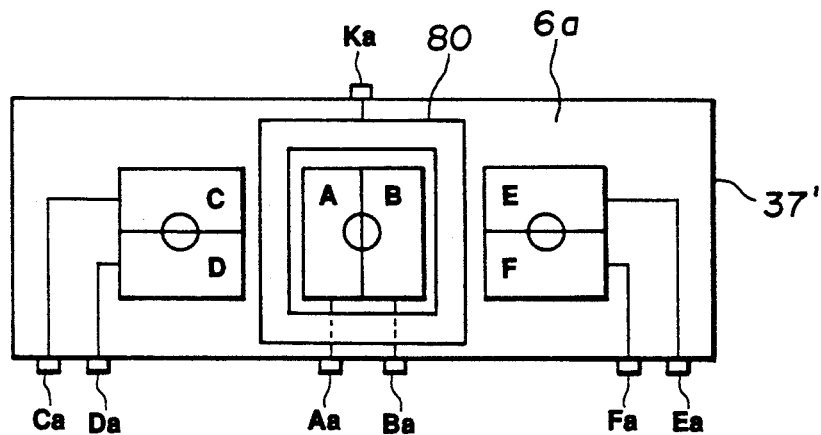
FIG. 10 is an explanatory diagram showing the formation of a photodetector in a modification of the first embodiment.

In this embodiment, because the same photodetecting devices as the photodetecting devices A to F are used to absorb the photocurrent, as compared with the prior art example, the photodetecting devices G and H for absorbing the photocurrent may be the only ones which are newly-added. Therefore, the circuit need not be changed at all. If the newly-added device absorbs photocurrents, the material will not be limited. For example, as in the photodetector 37′ shown in FIG. 10, a conductor 80 of a square ring enclosing the periphery of the photodetecting devices A and B will do. This conductor 80 is connected with a common cathode terminal Ka of the photodetecting devices A to F forming the photodetector 37. In this modification, the photocurrent flowing out of the photodetecting devices A and B through the chip 6a flows to the Vcc through the conductor 80. That is, the photocurrent flowing out of the photodetecting devices A and B through the chip 6a is absorbed or bypassed by the conductor 80. In FIG. 10, Aa to Fa represent anodes of the photodetecting devices A to F.

Figure 11:
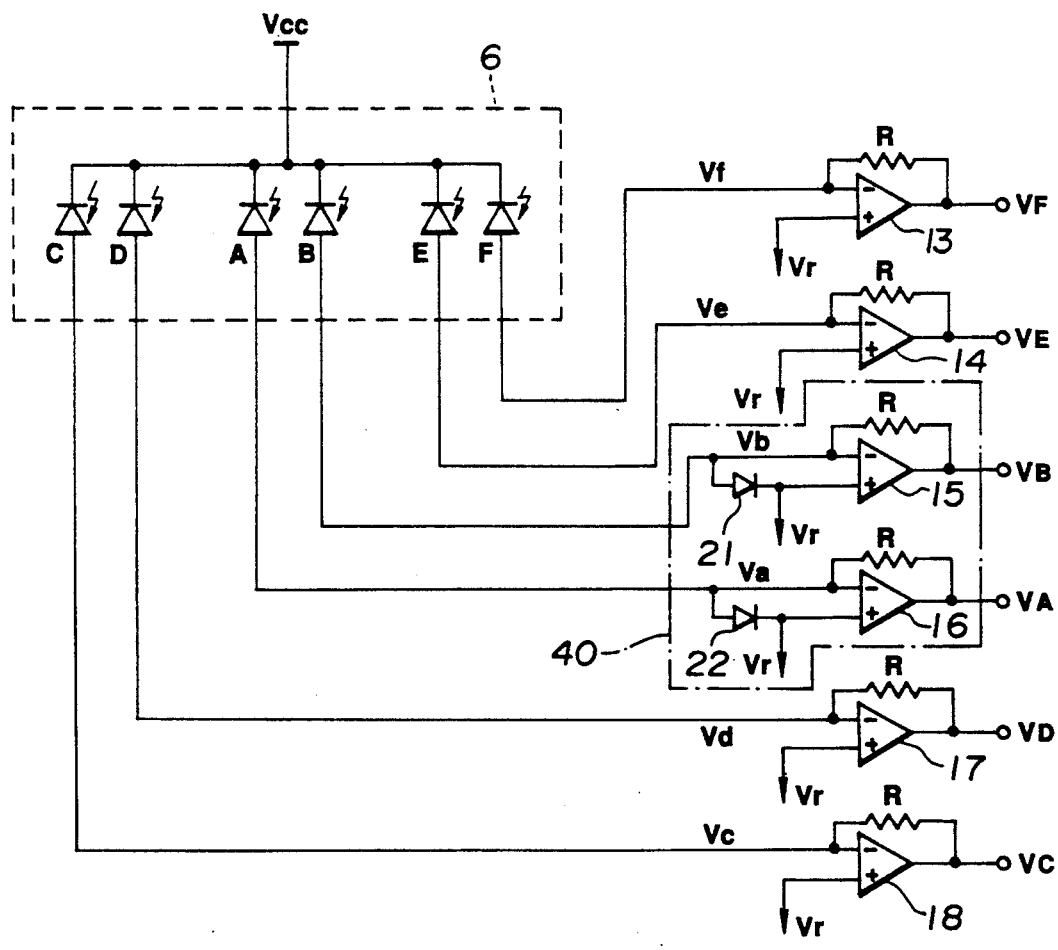
FIG. 11 is a circuit diagram showing a current/voltage converting circuit in the second embodiment of the present invention.

The second embodiment of the present invention shall be explained in the following with reference to FIG. 11 in which the photodetector 6 and the current/voltage converting circuit for the side beams are the same as in the prior art example. What is different from the prior art example is the internal forming part of the current/voltage converting circuit 40 shown by the one-point chain line.

Diodes 21 and 22 are provided respectively between the non-inverting input terminals and inverting input terminals of the operational amplifiers 15 and 16 used as the current/voltage converting circuit 40 for the main beam. The anodes of the diodes 21 and 22 are connected respectively to the inverting input terminals, and the cathodes are connected respectively to the non-inverting input terminals.

A limiting means for regulating the voltage between the terminals from becoming larger than the normal direction voltage of each of the diodes 21 and 22 is provided by connecting each of the diodes 21 and 22 between the non-inverting input terminal and inverting input terminal of each of the operational amplifiers 15 and 16. In other words, the levels of the output ends of the photodetecting devices A and B receiving the main beam of a large incident light amount are limited that vary above a fixed level.

Each of diodes 21 and 22 is provided as a limiting means for limiting the voltage between the above-mentioned terminals so that, as a result, the generation of a leaking current may be prevented.

Now, the operation of this current/voltage circuit 40 shall be explained. Here, the operational amplifiers 15 and 16 operate the same as in the first embodiment and therefore only the operational amplifier 16 side shall be explained.

When the light amount of the main beam increases, the photocurrent flowing out of the photodetecting device A through a lead wire will increase. Thus, when the photocurrent flows above a fixed value, the output level of the operational amplifier 16 will substantially reach the power source voltage and the operation of the operational amplifier 16 will be saturated. By this saturation, the input terminal of the operational amplifier 16 will deviate from the imaginary short state and the potential Va of the inverting input terminal will lag from the potential Vr of the non-inverting input terminal and will rise in this case. The potential difference between the non-inverting input terminal and inverting input terminal of the operational amplifier 16 will reach the normal direction voltage Vf of the diode 22. Then, the diode 22 will be on and will conduct the current.

Figure 4:
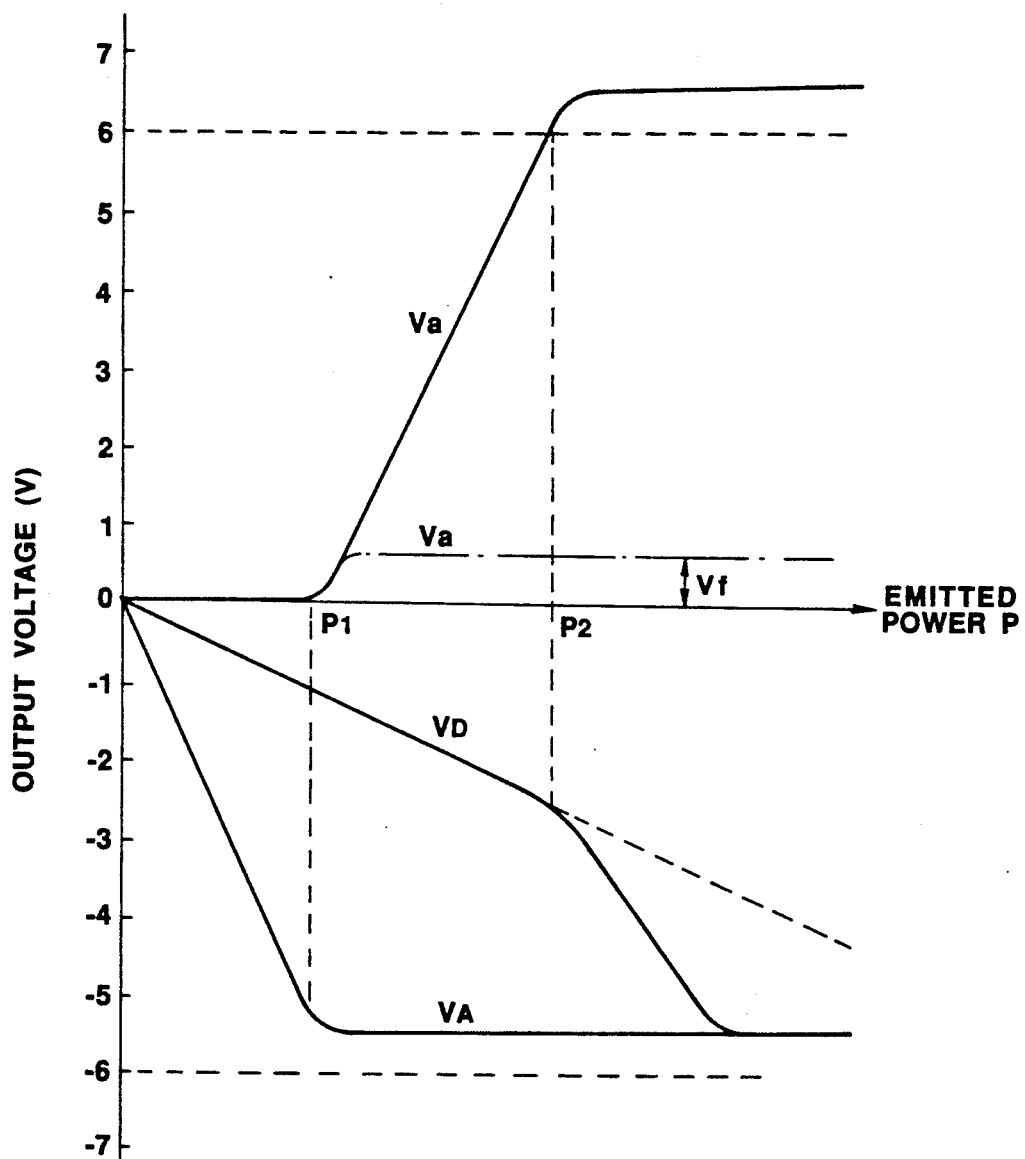

Therefore, after the diode 22 is conductive, however the photocurrent may increase, the photocurrent will flow into the reference potential Vr through the diode 22. Therefore, the potential Va of the inverting input terminal of the operational amplifier 16 will not rise to be above its value, the photocurrent of the photodetecting device A will be able to flow out and therefore the photodetecting device A will be prevented from being saturated. In FIG. 4, the potential of the inverting input terminal of the operational amplifier 16 is shown by the one-point chain line. In this case, the Vr is made zero. As seen from the one-point chain line in FIG. 4, the level of the anode as the output end of the photodetecting device A is limited such that it varies to be above a fixed level.

Therefore, the leaking current can be prevented from flowing out of the photodetecting device A through the surrounding chip by the saturation of the photodetecting device A. Therefore, in case an error signal is produced by using the outputs of the photodetecting devices C to F around the photodetecting device A, the influence of noises by the leaking current will be able to be avoided.

In this embodiment, as a diode is provided between the non-inverting input terminal and inverting input terminal of the operational amplifier used as a current/voltage converting means for the output of the photodetecting devices A and B receiving the main beam of a large light amount, the photodetecting devices A and B can be prevented from being saturated, therefore, the photocurrent flowing into the photodetecting devices C to F receiving the side beams can be dissolved and the focusing and tracking by utilizing the side beams can always be stably made.

As this embodiment is a means for preventing the saturation of the photodetecting devices A and B, it can be applied also to the case of a photodetector producing an error signal by another system and a signal processing system. For example, as in the astigmatic system, the photodetector may be divided into a plurality of photodetecting devices which may not always be formed as separated from each other.

Figure 12:
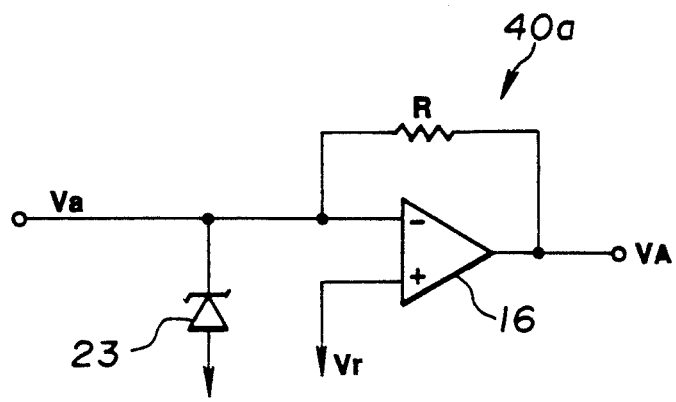
FIG. 12 is a circuit diagram showing a current/voltage converting circuit in a modification of the second embodiment.

FIG. 12 illustrates an essential part of a modification of the second embodiment. In this diagram is illustrated only one operational amplifier 16 side circuit 40a in the current/voltage converting circuit 40 for the main beam shown by the one-point chain line in FIG. 11. The operational amplifier 15 side is also of the same circuit formation. Formations other than the current/voltage converting circuit 40 are the same as in the second embodiment.

As shown in FIG. 12, a Zener diode 23 is connected on the cathode side to the inverting input terminal of the operational amplifier 16 and is connected at the anode to a power source 61 feeding a fixed voltage Vs.

The same as in the second embodiment, when the operational amplifier 16 is saturated, the voltage of the inverted input terminal will rise. When the potential difference between this voltage and the voltage on the anode side of the Zener diode 23 reaches the Zener voltage of the Zener diode 23, the Zener diode 23 will become conductive.

From the above, as in the second embodiment, after the Zener diode 23 becomes conductive, however the photocurrent may increase, the photocurrent will flow into the power source through the Zener diode 23. Therefore, the voltage of the inverting input terminal of the operational amplifier 16 will stop rising. Thereby, the photodetecting device A can be presented from being saturated and the leaking current flows out around.

Figure 13:
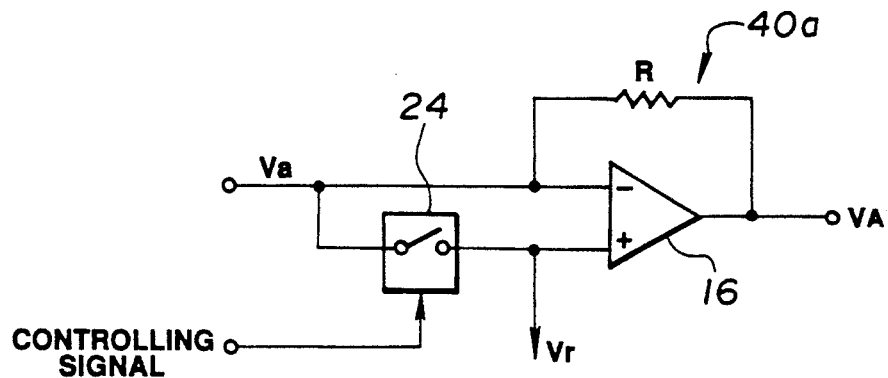
FIG. 13 is a circuit diagram showing a current/voltage converting circuit in the third embodiment of the present invention.

In FIG. 13, the third embodiment of the present invention, a switch 24 is inserted between the non-inverting input terminal and inverting input terminal of the operational amplifier 16 switchably is controlled by a controlling signal and will be on when saturation of the photodetecting device A is highly possible so that, if the switch 24 is switched on, however the photocurrent may increase, the photocurrent will flow into the power source connected to the inverting input terminal through the switch 24.

When the possibility of the photodetecting device A being saturated is high, pits will be written into the track of the optical recording medium 7. Therefore, a writing-in mode signal is used for the controlling signal showing the writing-in state or a modulated signal of an actually writing-in laser diode 1. Such controlling signal as a writing-in mode signal is output from the controller 42.

Figure 14A:
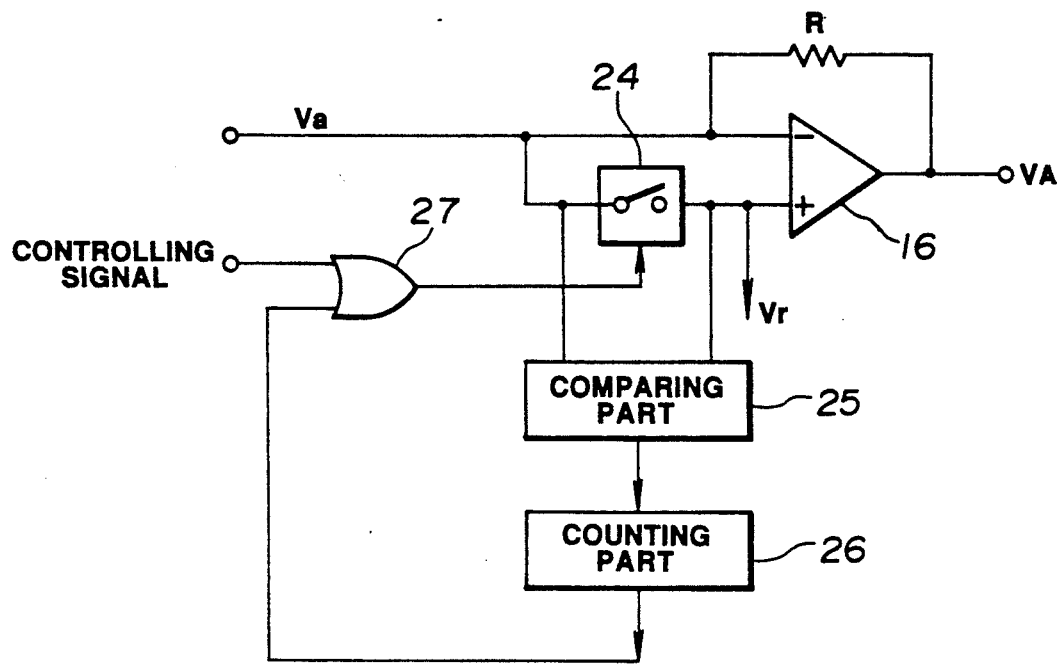
FIGS. 14a and 14b are circuit diagrams showing current/voltage converting circuits in a modification of the third embodiment.
Figure 14B:
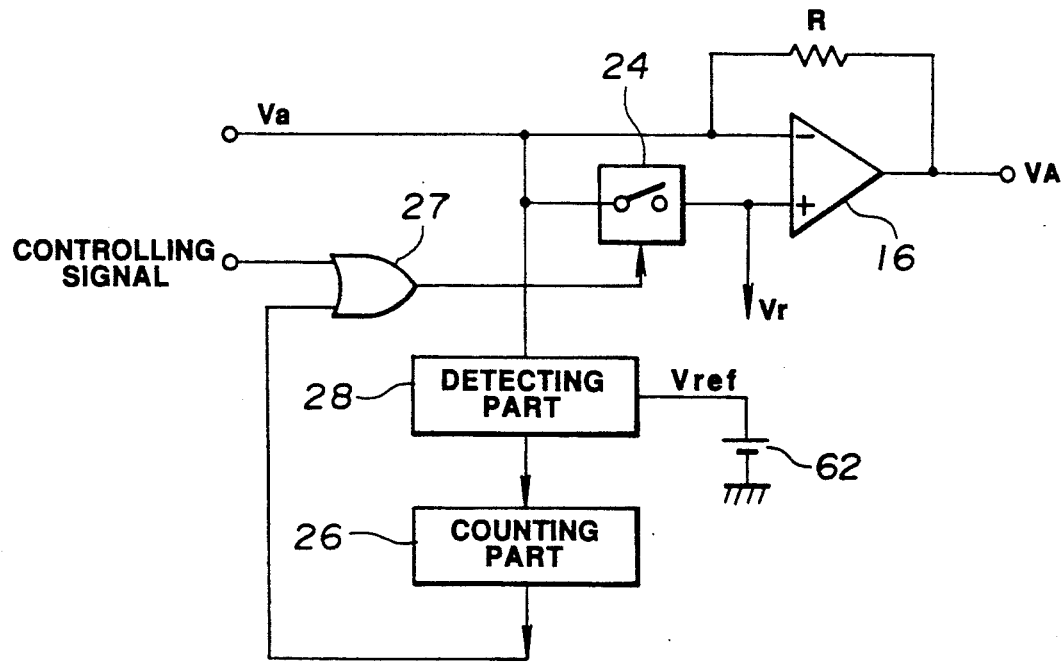

Modification controlling the switch 24 other than the controlling signal in the above mentioned third embodiment are shown in FIGS. 14a and 14b.

In these diagrams, the same component devices as in FIG. 13 shall bear the same reference numerals.

In FIG. 14a, the potentials of the non-inverting input terminal and inverting input terminal of the operational amplifier 16 are always compared with each other by a comparator 25. When the operational amplifier 16 is saturated by the increase of the photocurrent, the voltages of the non-inverting input terminal and inverting input terminal will be different. In case the two voltages are different, the comparator 25 will output a signal to the counting part 26. The counting part 26 having received this signal will output a signal switching on the switch 24 through an OR circuit 27 continuously for a fixed time which can be set from the time for counting a number, for example, with the counter. After a fixed time elapses after the switch 24 is switched on, the switch will be switched off.

The difference of FIG. 14b from FIG. 14a is that, instead of the comparing part 25, a detecting part 28 is connected to the inverting input terminal of the operational amplifier 16.

In FIG. 14b, when the voltage of the inverting input terminal of the operational amplifier 16 becomes above a voltage value Vref, the detecting part 28 will output a signal. To judge whether it is above the voltage value Vref or not, the voltage value Vref output from a reference power source 62 and the voltage of the inverting input terminal may be compared with each other in the detecting part 28. The counting part 26 having received the output signal of the detecting part 28 will output a signal switching on the switch 24 through the OR circuit 27 continuously for a fixed time which can be set from the time for counting a number, for example, with the counter. After a fixed time elapses after the switch 24 is switched on, the switch will be switched off.

By the above formation and operation, in the first and second modifications, when the possibility of the photodetecting device being saturated is high, the switch 24 will be switched on by the controlling signal so that the photodetecting device may be prevented from being saturated. Also, by always monitoring the operational amplifier, even when the possibility of the photodetecting device being saturated is not high, the photodetecting device will be prevented from being saturated. Further, when the switch 24 is switched on, a fixed time elapses and then the switch 24 is switched off, the photocurrent from the photodetecting device will be able to be expected to decrease.

Figure 15:
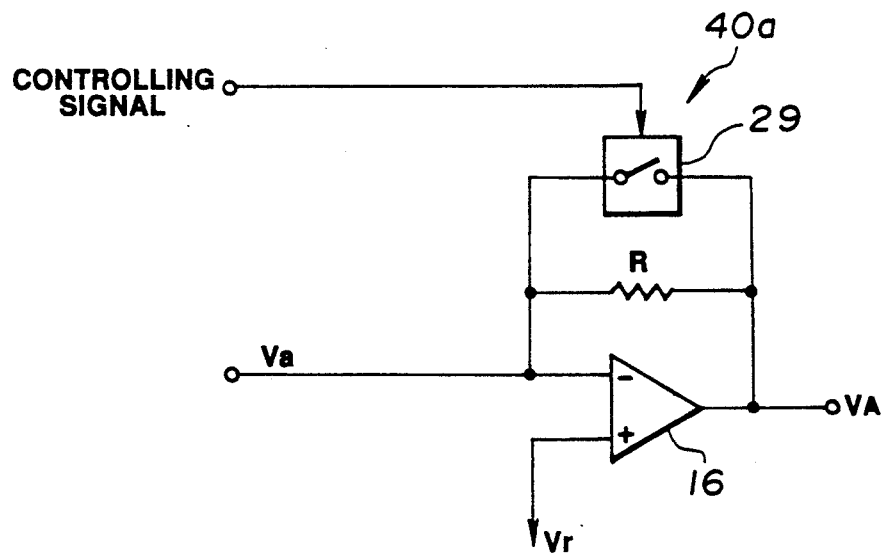
FIG. 15 is a circuit diagram showing a current/voltage converting circuit in the fourth embodiment of the present invention.

FIG. 15 is of the fourth embodiment of the present invention. This diagram illustrates only the circuit 40a on one operational amplifier 16 side in the current/voltage converting circuit 40 shown by the one-point chain line in FIG. 11. The circuit formation is the same also on the operational amplifier 15 side. Formations other than of the current/voltage converting circuit 40 are the same as in the second embodiment.

As shown in FIG. 15, a switch 29 is inserted between the inverting input terminal and output terminal of the operational amplifier 16 and is controlled by a controlling signal which is the same as is shown in FIG. 13.

From the above, the switch 29 will be on when the possibility of the photodetecting device A being saturated is high. When the switch 29 is on, this operational amplifier 16 will function as a buffer so that, while the switch is on, the inverting input terminal and output terminal of the operational amplifier will be always of the same value as of the voltage of the non-inverting input terminal. Therefore, even if the photocurrent flowing into the operational amplifier 16 increases, the operational amplifier 16 will not be saturated, the photodetecting device also will not be saturated, and the photocurrent will not flow into the photodetecting device receiving the side beam.

The controlling signal for the switch 29 in this embodiment may be the controlling signal in FIGS. 14a and 14b.

In the embodiments, the present invention is not limited to the photodetector shown in FIG. 2 or 5 but can be applied in the same manner to a photodetector of a different formation divided into a plurality of parts.

Also, different embodiments may be formed by partly combining the above-described respective embodiments.

What is claimed is:
1. A signal producing apparatus comprising:
an optical pickup provided with a light source for generating light beams and an optical system for condensing and radiating said light beams on an optical recording medium on which tracks for recording information are formed and leading the light reflected by said optical recording medium to a photodetector for receiving the light;
a plurality of photodetecting devices forming said photodetector, said photodetecting devices being formed on a common chip;
a current/voltage converting circuit current/voltage converting the signal photoelectrically converted by said photodetector wherein said current/voltage circuit contains an operational amplifier which is saturated depending on the quantity of incident light on at least one of said photodetecting devices;

a calculating circuit producing at least one signal of a track error signal representing a position displacement, in the direction crossing said tracks, of a light spot radiated to said optical recording medium and a focus error signal representing a position displacement from the focus position of said light spot and a reproduced signal corresponding to the information recorded on the above-mentioned tracks; and a suppressing means for suppressing the generation of noises caused by a leaking saturation photocurrent leaking through said chip from a second of the photodetecting devices to a first of the photodetecting devices in which an amount of light incident upon said second photo detecting is larger than an amount of light incident upon said first photodetecting device.

2. A signal producing apparatus according to claim 1 wherein said suppressing means is formed on said chip.

3. A signal producing apparatus according to claim 2 wherein said suppressing means comprises a leaking photocurrent absorbing member for absorbing/bypassing said leaking photocurrent.

4. A signal producing apparatus according to claim 1 wherein said suppressing means is a part of said current-/voltage converting circuit.

5. A signal producing apparatus according to claim 4 wherein said suppressing means is a leak generation suppressing means for suppressing the generation of said leaking photocurrent for the output of said second photodetecting device in said current/voltage converting circuit.

6. A signal producing apparatus according to claim 1 wherein said suppressing means is formed of a leaking photocurrent absorbing member to absorb/bypass said leaking photocurrent between said first photodetecting device and said second photodetecting device in case said first photodetecting device and said second photodetecting device are formed separate from each other on said chip.

7. A signal producing apparatus according to claim 6 wherein said leaking photocurrent absorbing member is a biterminal device formed of the same material as of any photodetecting device forming said photodetector, said biterminal device being electrically conductive.

8. A signal producing apparatus according to claim 2 wherein said leaking photocurrent absorbing member is a ringlike conductor surrounding the periphery of said second photodetecting device and is formed of a material conducting an electric current.

9. A signal producing apparatus according to claim 1 wherein said suppressing means is a limiting circuit limiting the photoelectric converting output level of said second photodetecting device to be within a range of a fixed level.

10. A signal producing apparatus according to claim 1 wherein said suppressing means is a limiting circuit limiting the input level between the input ends of said current/voltage converting circuit.

11. A signal producing apparatus according to claim 9 or 10 wherein said limiting circuit comprises a diode.

12. A signal producing apparatus according to claim 9 or 10 wherein said limiting circuit comprises a Zener diode.

13. A signal producing apparatus according to claim 1 wherein said suppressing means has a switching means for timely conducting the input level between the input ends of said current/voltage converting circuit with a controlling signal.

14. A signal producing apparatus according to claim 13 wherein said suppressing means has further a comparing circuit for comparing the input level between the input ends of said current/voltage converting circuit with a reference level, said switching means being conductive also by the output of said comparing circuit.

15. A signal producing apparatus according to claim 1 wherein said current/voltage converting circuit is formed of a plurality of operational amplifiers respectively current/voltage converting the photoelectrically converted outputs of said plurality of photodetecting devices.

16. A signal producing apparatus according to claim 15 wherein said suppressing means is a timely conducting means timely conducting with a controlling signal a feedback resistance connected between the input and output ends of the operational amplifier current/voltage converting the output of said second photodetecting device.

17. A signal producing apparatus according to claim 1 wherein said photodetector is formed on said chip and receives three light beams reflected by said optical recording medium.

18. A signal producing apparatus according to claim 17 wherein said second photodetecting device receives the central light beam among said three light beams.

19. A signal producing apparatus according to claim 17 wherein said second photodetecting device receives the light beam for producing said reproduced signal.

20. A signal producing apparatus according to claim 17 wherein said first photodetecting device receives the light beam for producing said error signal.

* * * * *